United States Patent [19]

Koslow

[11] Patent Number: 4,537,608
[45] Date of Patent: Aug. 27, 1985

[54] SYSTEM FOR REMOVING CONTAMINANT PARTICLES FROM A GAS

[75] Inventor: Evan E. Koslow, Westport, Conn.

[73] Assignee: Pall Corporation, Glen Cove, N.Y.

[21] Appl. No.: 552,275

[22] Filed: Nov. 16, 1983

[51] Int. Cl.³ .............................................. B01D 50/00
[52] U.S. Cl. .......................................... 55/337; 55/347
[58] Field of Search .......................... 55/337, 346–349, 55/524

[56] References Cited

U.S. PATENT DOCUMENTS

| | | | |
|---|---|---|---|
| 1,886,548 | 11/1932 | Horne et al. | |
| 2,341,087 | 2/1944 | Dunham | 183/83 |
| 2,461,677 | 2/1949 | Burdock et al. | 183/81 |
| 2,542,549 | 2/1951 | McBride | 55/347 |
| 3,720,046 | 3/1973 | Kudirka et al. | 55/337 |
| 4,158,449 | 6/1979 | Sun et al. | 244/136 |
| 4,389,307 | 6/1983 | Boadway | 209/211 |
| 4,394,145 | 7/1983 | Sundseth | 55/347 |

*Primary Examiner*—David L. Lacey
*Attorney, Agent, or Firm*—Leydig, Voit, Osann, Mayer & Holt, Ltd.

[57] ABSTRACT

A system for removing contaminant particles from a gas such as air includes an assembly of vortex air cleaners and a depth filter which are disposed in series in a passage through which the air flows so that the larger particles and liquid droplets are removed from the air by the cleaners and the finer particles and finely divided liquid particles are removed by the filter. The vortex air cleaners are arranged side by side in two perpendicular rows and the direction of the rotational flow imparted by each is of the opposite hand from the direction of flow imparted by each adjacent cleaner so that, in the regions where the flows from two adjacent cleaners interact, the flow vectors from the two cleaners are in the same direction. This maintains the rotational flows as the air travels to and enters the filter with the result that plugging of the upstream side of the filter is virtually eliminated and the full depth of the filter is effectively utilized.

4 Claims, 6 Drawing Figures

SYSTEM FOR REMOVING CONTAMINANT PARTICLES FROM A GAS

BACKGROUND OF THE INVENTION

The invention relates to a system for cleaning a gas such as air by removing contaminants in the form of particles and liquid particles and, more particularly, the invention relates to a system which includes an assembly of vortex cleaners disposed side by side in the path of the gas and a barrier filter of the depth type which is located downstream of the vortex cleaner assembly. As the gas passes through the vortex cleaners, each cleaner imparts a rotational flow to the gas to separate and remove the larger particles and liquid droplets. Thereafter, the fine particles and the finely divided liquid particles are deposited in the filter. A system of this general type is disclosed in Sun et al U.S. Pat. No. 4,158,449.

In prior systems of this type, the filter plugs at an abnormally high rate with the result that the pressure drop across the filter increases at a substantially higher than normal rate as the loading of contaminant particles in the filter increases. The potential dirt capacity of the filter, therefore, is not attained.

SUMMARY OF THE INVENTION

The general object of the invention is to provide a novel system in which the barrier filter is essentially as effective in the system as it is when used alone and to achieve this by maintaining the flows from the vortex cleaners as well-defined rotational flows as the gas enters the barrier filter and to gradually change this to a well-defined laminar flow as the gas passes through the filter thereby to deposit particles relatively uniformly throughout the depth of the filter.

A more detailed object is to arrange the vortex cleaners so that, in the region where the flow from one interacts with the flow from another, the velocity vectors of the two are in the same direction and of generally the same magnitude to conserve the rotational energy imparted by the cleaners.

Another object is to achieve such conservation of rotational energy by constructing the vortex cleaners so that the rotational flow imparted by each is of the opposite hand as the rotational flow imparted by an adjacent cleaner whereby there is a constructive interaction of adjacent flows.

The invention also resides in the arrangement of the vortex cleaners by which the flows of all adjacent cleaners in both of two perpendicular directions is of the opposite hand.

DETAILED DESCRIPTION OF THE PREFERRED EMBODIMENT

Figure 1:
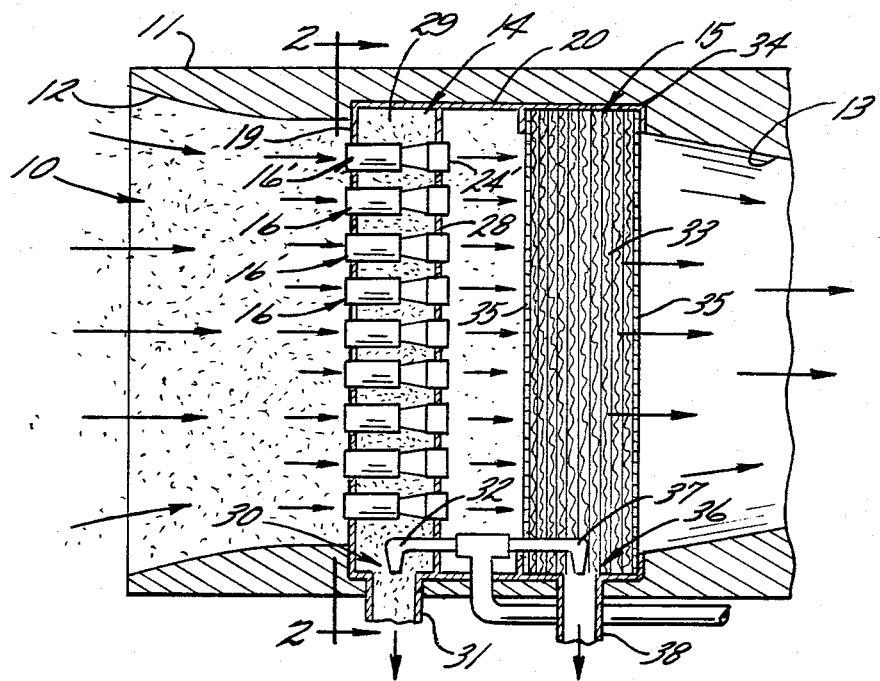
FIG. 1 is a schematic longitudinal sectional view of a system for removing contaminant particles from a gas and embodying the present invention.

As shown in the drawings for purposes of illustration, the invention is embodied in a system for cleaning a gas such as air by removing contaminant particles from the gas. The system is especially useful for removing aerosol contaminants from air delivered to high technology engines such as through a passage 10 in a housing 11, the air entering the inlet side 12 of the housing and leaving through the outlet side 13. The system includes a vortex cleaner assembly 14 which is disposed in the housing and centrifugally removes the major portion of the contaminants from the main flow of air. Also included in the assembly is a barrier filter 15 disposed in the passage 10 downstream of the assembly 14 and extending across the passage to remove substantially all of the remaining contaminants in the air.

Figure 2:
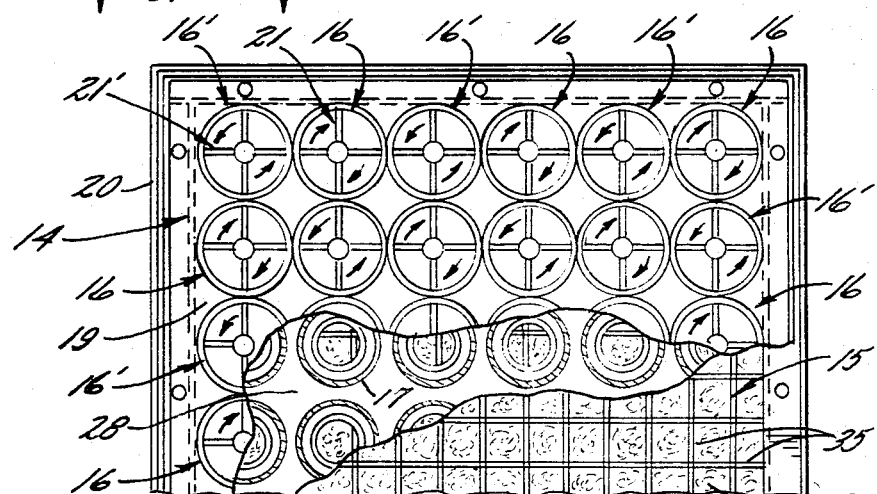
FIG. 2 is an enlarged sectional view taken along the line 2—2 in FIG. 1, parts being broken away and shown in section.
Figure 2:
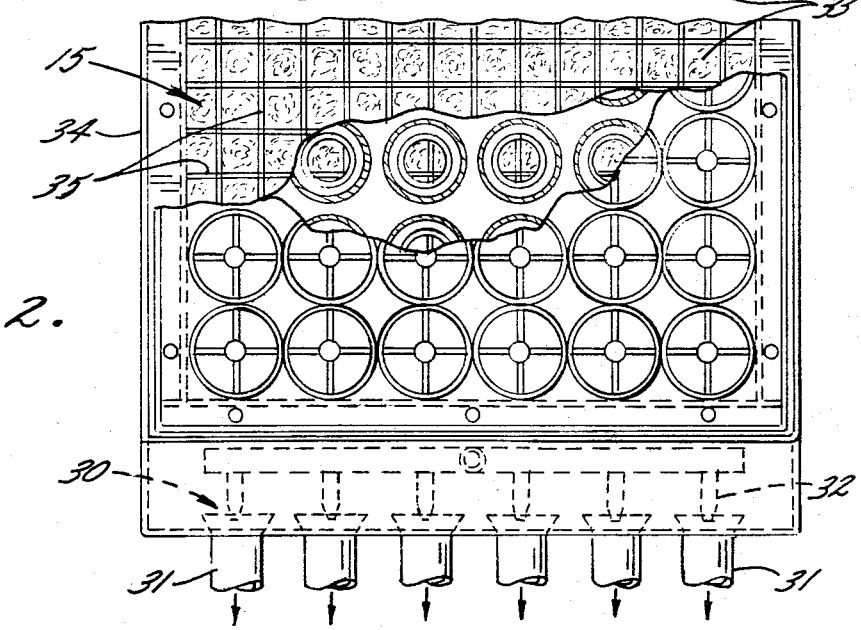

Herein, the vortex cleaner assembly 14 is made up of a plurality of conventional vortex air cleaners 16 and 16' (see FIGS. 1, 2 and 3) disposed side by side and extending along the path of the flow of the air through the passage 10. Thus, each air cleaner includes a body or drift tube 17 or 17' with all the tubes being parallel to each other and to the path of air flow. The inlet ends of the tubes project into holes 18 in a plate 19 which extends transversely across the passage and the tubes are rigidly secured to the plate. The latter is fastened to a box-like frame 20, which constitutes part of the housing 11, and is adjacent the inlet end of the housing. Disposed within the inlet end portion of each tube is a vortex generator 21 or 21' which imparts a rotational flow to the air as it enters the tube. For this purpose, each generator includes a plurality of helical vanes 22 or 22', herein four, which extend around and are rigid with a core 23 or 23' disposed along the axis of the tube.

Figure 3:
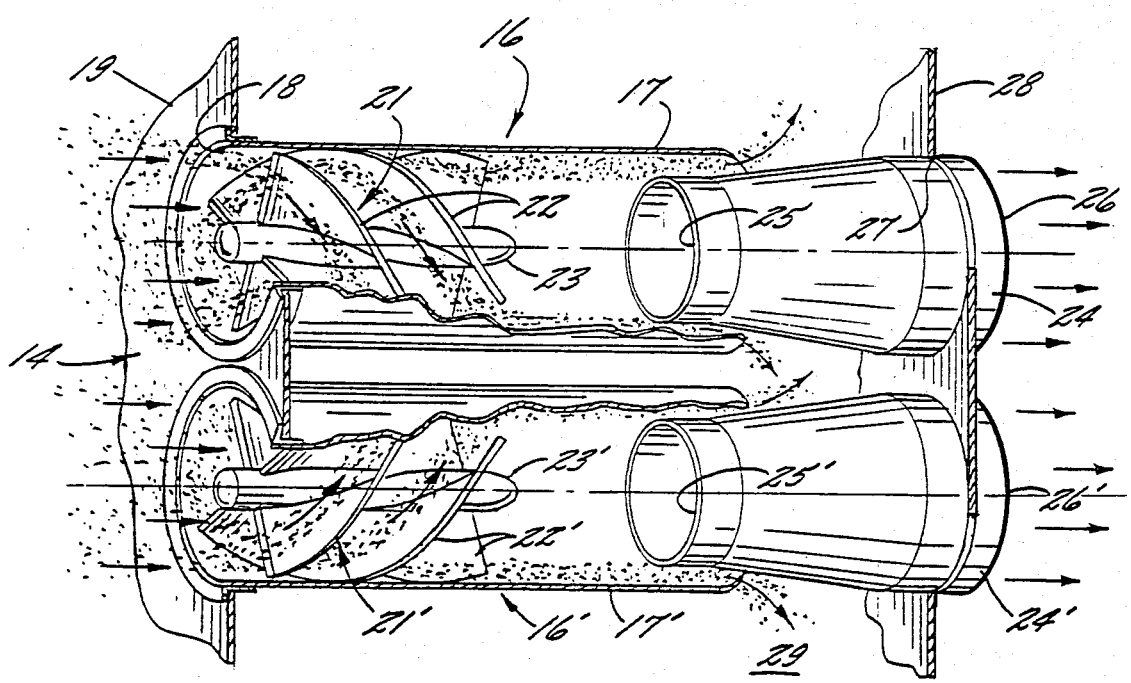
FIG. 3 is an enlarged fragmentary perspective view of two adjacent vortex cleaners as used in the system of FIG. 1.
Figure 4:
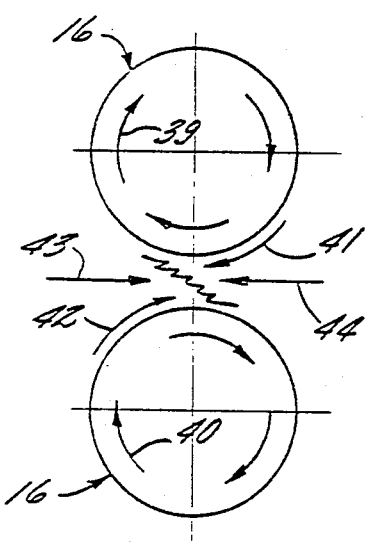
FIG. 4 is a schematic end view of two adjacent vortex cleaners as used in prior systems and illustrating the flows from the two cleaners.

The rotational flow component added by the vortex generators 21 and 21' to the flow of air through the drift tubes 17 or 17' centrifugally spins the major portion of the contaminant particles, especially the larger particles and liquid droplets, toward the walls of the tubes as illustrated in FIGS. 3 and 4. Air without these particles travels along the central portions of the tubes and out through outlet tubes 24 or 24'. There is one such outlet tube for each drift tube with the outlet tubes being coaxial with their respective drift tube. Each outlet tube has an inlet end portion 25 or 25' of reduced diameter disposed within the outlet end portion of the associated drift tube and the outlet tube is flared toward its outlet end portion 26 or 26' to permit the comparative free flow of air. The outlet end portions of the tubes 24 and 24' project into holes 27 in a second plate 28 and are secured to the latter so that these tubes are maintained in a fixed relationship with the tubes 17 and 17'. The plate 28 is parallel to and downstream of the plate 19 and is similarly fastened to the frame 20 so that the two plates form a chamber 29 between them.

The portion of air flowing adjacent the walls of the drift tubes 17 and 17' is used as scavenge air to carry the contaminant particles which have been separated by the rotational flow out of these tubes and into the chamber 29. Thus, the axial flow of this air passes around the inlet end portions of the outlet tubes 24 and 24' and out through outlet ends of the drift tubes into the chamber. An ejector 30 removes the contaminants from the chamber and, in this instance, the ejector includes an ejector tube 31 communicating with the chamber 29 and an air nozzle 32 disposed at the center of the inlet end of the ejector tube. Air under pressure from a suitable source (not shown) is discharged by the nozzle into the ejector tube and aspirates air and contaminant particles out of the chamber through the tube.

Air leaving the vortex cleaner assembly 14 has most of the larger and comparatively heavy particles and liquid droplets removed from it but fine paticles as well as finely divided liquid particles remain entrained in the air. To remove these particles, the air passes through the depth-type barrier filter 15, which preferably is a mist eliminator. The filter comprises a body 33 of fibrous material held in a second box-like frame 34 between rigid metal grids 35. The filter is of any suitable thickness, usually between 2 and 14 inches and, herein, is a rather open structure of a stainless steel or aluminum wire mesh similar to coarse steel wool. The mesh is wetted with a viscous oil so that the particles carried by the air impact upon and are retained by the oil as the air passes through the filter. Liquid contaminants removed by impinging the oil tend to flow to the bottom of the frame 34 and are removed by an ejector 36 (FIG. 1) which, like the ejector 30, includes an air nozzle 37 disposed in the inlet end of an ejector tube 38, the latter being mounted on and projecting through the frame. From the filter, the cleaned air leaves the housing 11 through the outlet 13 and is channeled to the place of use.

With prior arrangements of this type, a depth-type barrier filter is significantly less effective when used with a vortex cleaner assembly than it is when used alone. In other words, the filter plugs at an abnormally rapid rate when a vortex cleaner assembly is used and this results in the pressure drop across the filter increasing at a substantially higher rate as the loading of contaminant particles in the filter increases. In some cases, it has been found that the change in this pressure differential when a vortex cleaner assembly is used is roughly double that of what normally would be expected of the filter. Because of this, the potential dirt capacity of the filter cannot be attained and it has been necessary to clean or change the filter more frequently than might be expected.

The present invention is based upon the recognition that, when the rotational flow of the vortex air cleaners is all of the same hand, adjacent portions of the flows from the cleaners oppose each other and create turbulence and, further, that this turbulence results in a comparatively rapid deposit of particles at the upstream side of the barrier filter so that this portion becomes clogged and prevents the effective use of the remainder of the filter. Thus, as illustrated schematically in FIG. 4, when two adjacent cleaners produce a rotational flow in a clockwise direction as indicated by the arrows 39 and 40, the flow from one is opposite to the flow from the other in the region where the two flows interact as illustrated by the arrows 41 and 42. In other words, the flows at their boundaries have opposing velocity vectors 43 and 44 which results in a high shear effect and this shear acts to quickly dissipate the rotational energy of the flows.

In addition, the turbulence created by the opposing flows from adjacent cleaners produces a significant dissipation of energy within the upstream portion of the barrier filter as the air stream undergoes a transition from turbulent flow to laminar flow. This results in premature loading and a corresponding premature plugging of this portion of the filter so that there is an unacceptable pressure drop across the filter before the full utilization of the potential dirt capacity of those portions of the filter located further downstream. In addition, the turbulence creates a back pressure which detracts from the performance of the vortex air cleaners in separating the larger particles from the air.

Figure 5:
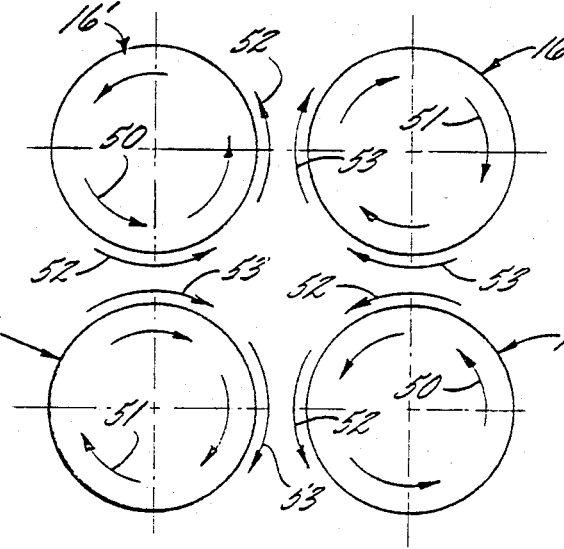
FIG. 5 is a view similar to FIG. 4 but illustrating the flows from adjacent cleaners in the system of the present invention.

Based upon the foregoing recognition, the present invention contemplates the provision of a novel gas cleaning system which utilizes both an assembly 14 of vortex gas cleaners and a depth-type barrier filter 15 in series but which conserves the rotational energy of the gas flow so that the effectiveness of both the cleaners and the filter is significantly increased. This is achieved by constructing and arranging the cleaners whereby, in the region where the flow from one interacts with the flow from another, the velocity vectors for both are in the same direction and are substantially identical to produce a constructive interaction with virtually no shear and a minimum dissipation of rotational energy. More specifically, the flow through and out of adjacent cleaners is of the opposite hand. Thus, as shown schematically in FIG. 5, the flow from one cleaner 16 is clockwise as indicated by the arrows 45 and the flow from the adjacent cleaner 16' is counterclockwise as illustrated by the arrows 46. At the boundary region between the two cleaners, the flow is in the same direction (arrows 47 and 48) as are the velocity vectors which are shown as combined by the arrow 49.

Figure 6:
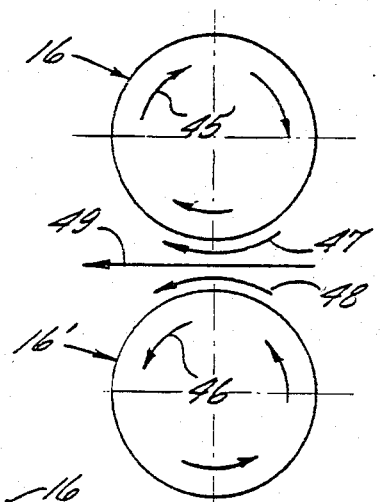
FIG. 6 is a view similar to FIG. 5 but showing a group of four adjacent cleaners.

Where, as in the present embodiment of the invention, multiple rows of vortex air cleaners are used, the flow of the opposite hand for adjacent cleaners is achieved by arranging them in rows in both of two perpendicular directions. This is illustrated schematically in FIG. 6 with four cleaners, two in each vertical row and two in each horizontal row. The upper cleaner 16' in the left hand row produces a counterclockwise flow as does the second cleaner 16' in the next row (see arrows 50) while the second cleaner 16 in the left hand row and the upper cleaner 16 in the next row produce clockwise flows (arrows 51). Thus, for any cleaner, its flow in a boundary region is in the same direction as the flow from all adjacent cleaners as illustrated by the pairs of arrows 52, 53. This relationship is maintained regardless of the number of cleaners used by alternating the hand of the flows of the cleaners in both perpendicular directions, that is, both horizontally and vertically in FIGS. 2 and 6. This counter-rotating or opposite hand flow is obtained by making the helical vanes 22 and 22' of the vortex generators 21 and 21' of opposite hands but with the same helix angle for the vortex air cleaners 16 and 16' respectively (see FIG. 3) and by alternating the cleaners 16 and 16' in both of the two perpendicular directions.

With the foregoing arrangement, the well-defined rotational flows of air through the drift tubes 17 and 17' is maintained without significant turbulence as the air leaves the vortex air cleaners 16 and 16' and is maintained until the air reaches the barrier filter 15 which gradually converts the flow to a well-defined laminar flow. Because of this, the rotational flow penetrates deeply into the filter and produces a comparatively uniform deposit of contaminant particles throughout the thickness of the filter. In other words, deposit occurs during conversion to laminar flow and this conversion occurs essentially from one side of the filter to the other. In contrast, a turbulent flow is converted to laminar flow almost immediately upon contact with the filter with the result that the major deposit of particles is at the upstream side of the filter. Thus, by maintaining a well-defined flow and gradual conversion through the filter, premature plugging of the filter is avoided. In addition, the continued rotational flow of the air as it enters the filter produces a longer path through the filter with a resulting improvement in the efficiency of the filter. Accordingly, the capacity and hence the useful life of the filter is significantly increased. The virtual absence of turbulence also reduces the back pressure on the vortex air cleaners and this enhances the effectiveness of the cleaners.

I claim:

1. A system for removing contaminants from a gas, said system having, in combination, a housing having an inlet and an outlet to define a passage for the flow of gas carrying aerosol contaminants, a vortex cleaner assembly disposed within said passage and including a plurality of parallel tubes disposed in said passage and alined with the flow of gas through the passage, said tubes being alined in rows in each of two perpendicular directions, a plurality of vortex generators, one for each of said tubes and each disposed adjacent the inlet end of the associated tube to impart a rotational flow to the gas flowing through the tube, the rotational flow of the gas causing a major portion of the contaminants in the gas to be separated from the main flow of gas through said tubes, means for removing the separated contaminants from said passage, said vortex generators being constructed to impart rotational flows of preselected hands through said tubes with the flow through each tube being of the opposite hand from the flow through adjacent tubes in both of said perpendicular directions whereby the velocity vectors of the flow from any two tubes are in the same direction and of substantially the same magnitude in the region of adjacent flow so that the well-defined rotational flow of gas through said tubes is maintained without substantial turbulence as the gas leaves the vortex cleaner assembly, and a depth-type barrier filter disposed in said passage downstream of said vortex cleaner assembly between the vortex cleaner assembly and the outlet of the passage and extending across the passage to further remove contaminants from the gas as it passes through the filter by gradually converting the well-defined rotational flow of the gas to a well-defined laminar flow, said rotational flow facilitating penetration of said gas into said filter before conversion to laminar flow, thereby effecting deposition of contaminant particles throughout the thickness of said filter.

2. A system as defined in claim 1 in which said barrier filter includes a thickness of wire mesh through which the gas flows.

3. A system as defined in claim 2 in which said wire mesh is coated with a film of oil and contaminants in the gas impact upon the oil and thereby are removed from the gas.

4. A system for removing contaminants from a gas, said system having, in combination, a housing having an inlet and an outlet to define a passage for the flow of a gas carrying aerosol contaminants, a vortex cleaner assembly disposed within said passage and including a plurality of parallel tubes disposed in said passage and alined with the flow of gas through the passage, said tubes being alined in rows in each of two perpendicular directions, a plurality of stationary helical vanes, one for each of said tubes and each disposed adjacent the inlet end of said tube and extending longitudinally thereof to impart a rotational flow to the gas flowing through the tube, the rotational flow of the gas causing a major portion of the contaminants in the gas to be separated from the main flow of gas through said tubes, means for removing the separated contaminants from said passage, the vane in each of said tubes being of opposite hand from the vanes in all adjacent tubes in both of said perpendicular directions whereby the flow from any tube is correspondingly opposite in hand from the flow from adjacent tubes and the velocity vectors of the flow from any two tubes are in the same direction and of substantially the same magnitude in the region of adjacent flow so that the well-defined rotational flow of gas through said tubes is maintained without substantial turbulence as the gas leaves the vortex cleaner assembly, and a barrier filter disposed in said passage downstream of said vortex cleaner assembly between the vortex cleaner assembly and the outlet of the passage and extending across the passage to further remove contaminants from the gas as it passes through the filter by gradually converting the well-defined rotational flow of the gas to a well-defined laminar flow, said rotational flow facilitating penetration of said gas into said filter before conversion to laminar flow, thereby effecting deposition of contaminant particles throughout the thickness of said filter, said filter including a thickness of wire mesh through which the gas flows and the wire mesh being coated with a film of oil whereby contaminants in the gas impact upon the oil and are removed from the gas.

* * * * *